July 5, 1966 K. L. RICHARD 3,259,862
TUNABLE ELECTRONIC COMPONENT
Filed May 27, 1963
Fig. 1.
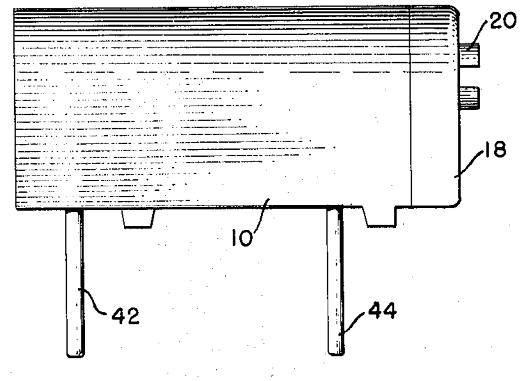
Fig. 2.
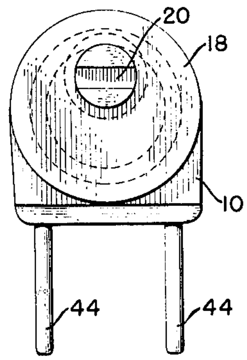
Fig. 3.
Fig. 4.
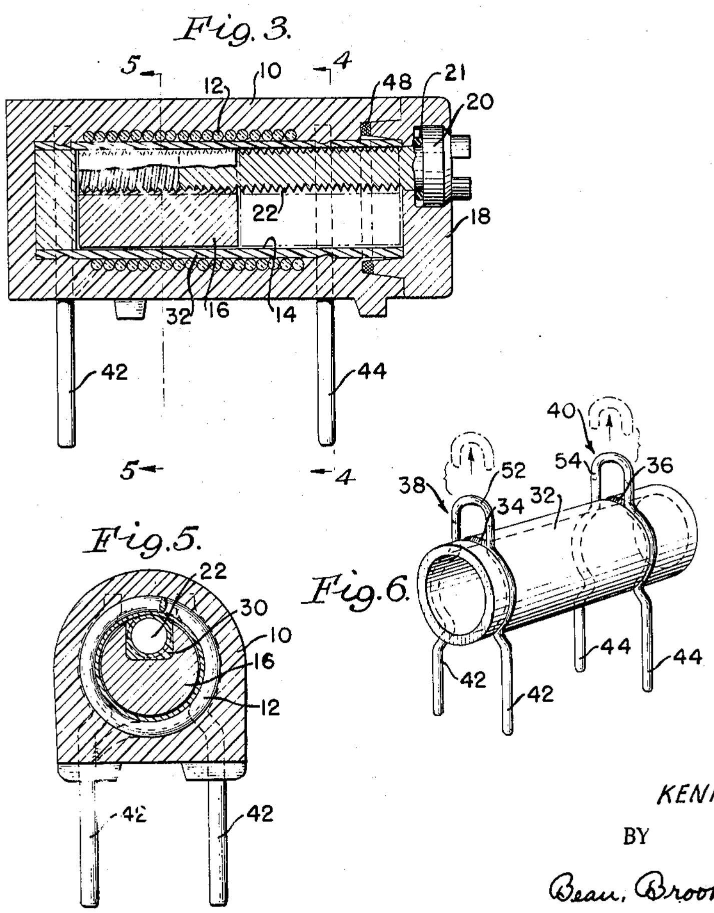
Fig. 5. Fig. 6.
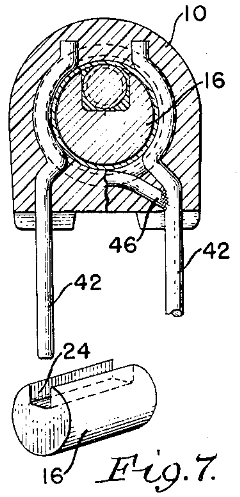
Fig. 7.
INVENTOR.
KENNETH L. RICHARD
BY
Beau, Brooks, Buckley & Beau
ATTORNEYS 3,259,862
Patented July 5, 1966

3,259,862

TUNABLE ELECTRONIC COMPONENT

Kenneth L. Richard, S. Ostrander Road,
East Aurora, N.Y.

Filed May 27, 1963, Ser. No. 283,479
3 Claims. (Cl. 336—136)

This invention relates to miniature electronic components and, in particular, relates to certain improvements in the construction and fabrication of tunable coils, transformers and the like.

In the miniature electronic component field, it is frequently desirable, in connection with tunable or variable components, to avoid any dimensional increase or expansion of the component incidental to tuning. If this result is to be achieved in conjunction with nicety of tuning and the ability of the component to remain in adjustment, some form of screw thread arrangement must be used internally of the component in conjunction with an externally accessible, axially fixed but rotatable tuning member. Unfortunately, such an arrangement requires the sacrifice of some type of performance if conventional construction is followed. It is, therefore of primary concern in connection with this invention to provide a novel arrangement for tunable or variable miniature electronic components wherein no dimensional expansion occurs incidental to tuning and wherein such effect is achieved while obtaining nicety of control, capability for maintaining and holding an adjusted position, and capability for withstanding elevated temperatures without sacrifice of moisture-proof characteristics.

Fundamentally, these objectives are attained according to the present invention by the expedient of forming the movable tuning element with an eccentric or off-axis trough or slot within which a threaded axial feed member is disposed. The axial feed member is threadably joined with the tuning element by suitable adhesive or the like disposed in the trough in at least major-portion surrounding relation with the axial feed member. The adhesive or the like thus forms, in effect, a nut within the trough by means of which axial movement of the tuning element is achieved in response to rotation of the axial feed member.

Other objects and advantages of the invention will appear from the description hereinbelow and the accompanying drawing wherein:

FIG. 1 is a side elevational view of a miniature tunable coil constructed in accordance with the present invention;

FIG. 2 is an end elevation of the assembly shown in FIG. 1;

FIG. 3 is alongitudinal section taken through the assembly shown in FIG. 1;

FIG. 4 is a cross section taken substantially along the plane of section line 4—4 in FIG. 3;

FIG. 5 is a cross section taken substantially along the plane of section line 5—5 in FIG. 3;

FIG. 6 is a perspective view of the coil form and terminal members associated therewith; and FIG. 7 is a perspective view of the tuning slug.

With reference at this time more particularly to FIG. 3, the assembly as shown therein will be seen to consist of a body 10 fixedly carrying a coil 12 therewithin with there being an opening or bore 14 extending along the length of the coil 12. Slidably disposed within the bore 14 is a tuning element in the form of a slug 16 of suitable ferrous or like material and it will be noted that the length of the slug 16 is such in relation to the length of the bore 14 that the slug may be positioned between the extreme ends of travel as depicted by the full and dotted line positions in FIG. 3 so as to effect variable tuning as will be readily understood. In the particular construction shown, the body 10 including the end wall member 18 forms an airtight enclosure or chamber for the slug 16 and, as is standard in constructions of this type, the space within the enclosure or chamber may be partially filled with silicone grease or the like to enhance moisture-proofing of the assembly.

The end wall member 18 journals therewithin the head end portion 20 of an axial feed member, such member being provided, beyond the end wall member 18, with external threads 22 substantially as is shown. The head 20 is journalled within and held captive in the end wall member 18 in any suitable fashion such as by causing the end wall member 18 to partially embrace the head 20 substantially as is shown in FIG. 3. Further, an O-ring 21 may be positioned as shown to provide a moisture barrier at this point. In any event, it is to be understood that the axial feed member is capable of rotation but incapable of axial displacement by virtue of its association with the end wall member 18. Further, it is preferred that the axial feed member be constructed of non-metallic material such as nylon or the like, in order to achieve maximum inductive efficiency and effectiveness for the component.

The tuning slug 16, as is shown in FIG. 7, is provided with an off-axis or eccentric trough or slot 24 dimensioned to receive the threaded portion 22 of the axial feed member in the manner indicated more clearly in FIGS. 3, 4 and 5. It will be noted that the head 20 is so journalled as to position the axial feed member 22 eccentric to the axis of the bore 14; that is, the axial feed member extends parallel to but in offset relationship with the axis of the bore 14. In order to effect threaded engagement between the portion 22 of the axial feed member and the tuning slug 16, a deposit 30 of adhesive or like material is made within the trough 24 of the tuning slug 16 so that such deposit is in at least major portion-surrounding relationship to the threaded portion 22 of the axial feed member. The deposit keys itself to the tuning slug 16 while at the same time conforming faithfully to the contours of the axial feed member and forming, in effect, a nut to achieve the aforementioned threaded engagement.

In the specific embodiment shown, it will be noted that the bore 14 is formed by the interior of a coil form 32, see particularly FIG. 6, which may be conveniently provided with annular grooves 34 and 36 receiving the terminal-forming clips 38 and 40. When in the assembled position as shown in FIG. 6, the coil 12 is wound on the coil form between the clips 38 and 40 with the opposite ends of the coil being joined to one of the respective legs 42 or 44 of the clips in the fashion indicated at 46 in FIG. 4. The coil form assembly is subsequently embedded within a suitable synthetic resinous material forming the aforementioned body 10 and, lastly, the end wall member 18 is joined to the assembly to provide the airtight enclosure aforementioned, suitable adhesive or like means 48 being provided for joining the end wall member 18 to the body 10. Subsequent to winding of the coil or coils, the bight portions 52 and 54 of the clips 38 and 40 are removed as is indicated by the dotted lines in FIG. 6. For this purpose, the clips are cemented to the coil form and it will be appreciated that a sufficient amount of the bight portions will be removed so that they are not exposed through the body 10. Such an arrangement is also beneficial if instead of a single coil, a transformer assembly consisting of two coils is to be wound on the coil form 32, in which latter case, four separate legs 42, 42, 44 and 44 are available to provide the terminals for the transformer.

In a tunable coil such as is shown in FIG. 3, it is important to enable the tuning slug to be of as large diameter as is possible, relative to the inner diameter of the coil 12; and for this reason, the coil form 32 should be as thin as possible. Moreover, the material from which the coil form is made must be capable of withstanding elevated temperatures while at the same time being capable of good bonding with the body 10 in the interest of obtaining good moisture-proof characteristics. The moisture-proofing is also enhanced by the O-ring 21 and the provision of a silicone grease within the bore 14, as aforesaid. In order to obtain all of these characteristics; thin section coil form, capability of withstanding elevated temperatures, and moisture-proofing, it is important to avoid the necessity for using a threaded connection between the tuning slug 16 and the coil form 32. Generally speaking, if such a connection is used, the requirement for obtaining sufficient strength of the coil form threads, particularly at elevated temperatures, will dictate the use of a material for the coil form which will not possess good bonding characteristics with the body 10 and the moisture-proof aspect will consequently suffer. On the other hand, the very use of internal threads in the coil form and external threads on the tuning slug will inevitably result in a reduction of the proportion of the cross sectional area within the coil which is filled by the tuning slug. This obtains, generally speaking, from the fact that internally threading the coil form will require a thicker wall section therefor and, of course, the external threads on the tuning slug reduces its average diameter.

With the present construction, the coil form material may be selected to provide a thin wall section, capability for withstanding elevated temperatures, and good bonding characteristics; there being readily available commercial materials meeting these requirements. In addition, the construction easily obtains sufficient amount of "bind" between the threads of the feed member 22 and the deposit material 30 and closeness of fit between the slug 16 and the bore of the coil form 30 so that the assembly will hold and maintain its adjustment even in the presence of substantial vibration or other disturbing forces.

It is to be understood that certain changes and modifications as illustrated and described may be made without departing from the spirit of the invention or the scope of the following claims.

I claim:

1. In a tunable electronic component,
a body presenting a chamber having an end wall,
coil means fixed within said chamber and having a bore whose axis is perpendicular to said end wall,
a tuning slug slidably received in said bore,
a feed screw journalled in said end wall and extending therefrom into said bore parallel to the axis thereof but eccentric thereto,
said slug having an axially extending trough therein receiving said feed screw,
and means within said trough having threaded engagement with said feed screw.

2. In the component as defined in claim 1 wherein said means is a deposit of cured synthetic resinous material.

3. A tunable coil assembly comprising
a body having a coil therein provided with an axial opening within the confines of said coil and having an end wall closing one end of the opening,
a tuning slug slidably received in said opening, and
a feed screw journalled in said end wall and projecting therefrom into said opening in axially offset relation thereto and threadedly engaged with said tuning slug eccentrically thereof, said tuning slug being provided with an axially extending trough within which said feed screw is received, the threaded engagement between said tuning slug and said feed screw being effected by a deposit of adhesive material keyed within said trough in at least major-portion surrounding relation to said feed screw.

References Cited by the Examiner

UNITED STATES PATENTS

| | | | |
|---|---|---|---|
| 2,379,457 | 7/1945 | Ricker | 336—136 |
| 2,862,192 | 11/1958 | Golbert et al. | 336—136 |
| 2,904,845 | 9/1959 | Sperry | 264—242 |
| 3,027,527 | 3/1962 | West | 336—136 X |

ROBERT K. SCHAEFER, *Primary Examiner.*

JOHN F. BURNS, *Examiner.*

T. J. KOZMA, *Assistant Examiner.*